United States Patent
Wang et al.

(10) Patent No.: US 9,379,970 B2
(45) Date of Patent: Jun. 28, 2016

(54) SELECTIVE CONTENT ROUTING AND STORAGE PROTOCOL FOR INFORMATION-CENTRIC NETWORK

(75) Inventors: Guo Qiang Wang, Santa Clara, CA (US); Ravishankar Ravindran, San Jose, CA (US); Jun Wei, San Jose, CA (US); Xinwen Zhang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 674 days.

(21) Appl. No.: 13/287,772

(22) Filed: Nov. 2, 2011

(65) Prior Publication Data

US 2012/0297088 A1 Nov. 22, 2012

Related U.S. Application Data

(60) Provisional application No. 61/486,526, filed on May 16, 2011.

(51) Int. Cl.
G06F 15/173 (2006.01)
H04L 12/721 (2013.01)
H04L 29/06 (2006.01)

(52) U.S. Cl.
CPC ............ H04L 45/32 (2013.01); H04L 63/0272 (2013.01); H04L 63/0876 (2013.01)

(58) Field of Classification Search
CPC ..... H04L 45/00; H04L 45/60; H04L 12/4641; H04L 45/32; H04L 45/02; H04L 45/021; H04L 45/026; H04L 45/12; H04L 45/245; H04L 45/26; H04L 45/308; H04L 45/38; H04L 63/0876

USPC ......................................................... 709/238
See application file for complete search history.

(56) References Cited

U.S. PATENT DOCUMENTS

| | | | | |
|---|---|---|---|---|
| 6,985,959 | B1 * | 1/2006 | Lee | 709/238 |
| 7,623,446 | B1 * | 11/2009 | Allan et al. | 370/223 |
| 2005/0276251 | A1 * | 12/2005 | Biddiscombe et al. | 370/338 |
| 2006/0271705 | A1 * | 11/2006 | Garcia-Luna-Aceves | 709/242 |

(Continued)

OTHER PUBLICATIONS

Jeff Doyle, Oct. 19, 2005. "CCIE Professional Development Routing TCP/IP, vol. I, Second Edition" Retrieved on May 23, 2014 from <http://icourse.cuc.edu.cn/computernetworks/cisco/Books/Cisco.Press.CCIE.Professional.Development.Routing.TCP-IP%20.Volume.I-2nd%20Edtion%202005.pdf>.*

(Continued)

*Primary Examiner* — Brian J Gillis
*Assistant Examiner* — Juan C Turriate Gastulo
(74) *Attorney, Agent, or Firm* — Conley Rose, P.C.; Grant Rodolph; Adam J. Stegge

(57) ABSTRACT

A network component comprising a receiver configured to receive an advertisement for a content name for content associated with a list of secured router identifiers (SRIDs) that indicates a plurality of content routers authorized for routing and caching the content, a processor configured to determine whether to flood the advertisement to a plurality of neighboring nodes if a locally assigned SRID is included in the list of SRIDs received in the advertisement or to drop the advertisement otherwise, a transmitter configured to flood the advertisement on a plurality of ports coupled to the neighboring nodes, and a storage configured to cache received content if the received content is associated with the locally assigned SRID.

18 Claims, 8 Drawing Sheets

(56) References Cited

U.S. PATENT DOCUMENTS

| | | | |
|---|---|---|---|
| 2007/0058638 A1* | 3/2007 | Guichard et al. | 370/395.31 |
| 2007/0073876 A1* | 3/2007 | Shima | H04L 63/123 709/224 |
| 2008/0159291 A1* | 7/2008 | Sultan et al. | 370/392 |
| 2008/0247731 A1* | 10/2008 | Yamauchi et al. | 386/95 |
| 2009/0285209 A1* | 11/2009 | Stewart | H04L 65/1006 370/389 |
| 2010/0195655 A1* | 8/2010 | Jacobson | H04L 45/748 370/392 |
| 2011/0080853 A1* | 4/2011 | Thubert et al. | 370/255 |
| 2011/0280214 A1* | 11/2011 | Lee | H04W 36/023 370/331 |
| 2012/0134282 A1* | 5/2012 | Tirronen et al. | 370/252 |
| 2012/0182994 A1* | 7/2012 | Dec et al. | 370/392 |

OTHER PUBLICATIONS

"MOTOBLUR—Motorola Mobility, Inc. USA," http://www.motorola.com/Consumers/US-EN/Consumer-Product-and-Services/MOTOBLUR/Meet-MOTOBLUR, downloaded Oct. 28, 2011, 2 pages.

"MOTOBLUR—Motorola Mobility, Inc. USA," http://www.motorola.com/Consumers/US-EN/Consumer-Product-and-Services/MOTOBLUR/MOTOBLUR-Features, sign up page, downloaded Oct. 28, 2011, 2 pages.

"MOTOBLUR," http://en.wikipedia.org/wiki/Motoblur, downloaded Oct. 28, 2011, 2 pages.

* cited by examiner

SELECTIVE CONTENT ROUTING AND STORAGE PROTOCOL FOR INFORMATION-CENTRIC NETWORK

CROSS-REFERENCE TO RELATED APPLICATIONS

The present application claims the benefit of U.S. Provisional Patent Application No. 61/486,526 filed May 16, 2011 by Wang Guo Qiang et al. and entitled "Selective Content Routing and Storage Protocol for Information-Centric Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a content oriented network (CON), a content router is responsible for routing user requests and content to proper recipients. In the CON or an Information-Centric Network (ICN), a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network. In the CON, content delivery including publishing, requesting, managing (e.g., modification, deletion, etc.) may be based on content name and not content location. One aspect of the CON that may be different from traditional Internet Protocol (IP) networks is the ability of the CON to interconnect multiple geographical points and cache content temporarily or store content on a more persistent basis. This may allow content to be served from the network instead of an original server, and thus may substantially improve user experience. The caching/storing may be used for real time data that is fetched by the user or for persistent data that belongs to the user or to a content provider, e.g., a third party provider.

SUMMARY

In one embodiment, a network component comprising a receiver configured to receive an advertisement for a content name for content associated with a list of secured router identifiers (SRIDs) that indicates a plurality of content routers authorized for routing and caching the content, a processor configured to determine whether to flood the advertisement to a plurality of neighboring nodes if a locally assigned SRID is included in the list of SRIDs received in the advertisement or to drop the advertisement otherwise, a transmitter configured to flood the advertisement on a plurality of ports coupled to the neighboring nodes, and a storage configured to cache received content if the received content is associated with the locally assigned SRID.

In another embodiment, the disclosure includes a method implemented by at least one network component, comprising receiving at a content router an advertisement for a published content that comprises a content name, a list of SRIDs for a plurality of content routers authorized to route and cache the content, and a list of virtual private group (VPG) identifiers (IDs) for virtual private network (VPN) instances associated with the content and the content routers, populating a routing table with the content name if the content router's own assigned SRID is detected in the list of SRIDs, flooding the advertisement to a plurality of neighboring nodes if the content router's own assigned SRID is detected in the list of SRIDs, and dropping or further flooding (based on routing policy) the advertisement without populating the routing table if the content router's own assigned SRID is not detected in the list of SRIDs.

In a third aspect, the disclosure includes the disclosure includes a system comprising one or more content routers coupled to each other and configured to route and cache content data, one or more customer nodes coupled to at least some of the content routers and configured to publish and subscribe content data, wherein the customer nodes are enabled by a context-based networking framework to publish content data with user-empowered policy control for selective content access, storage, and routing.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
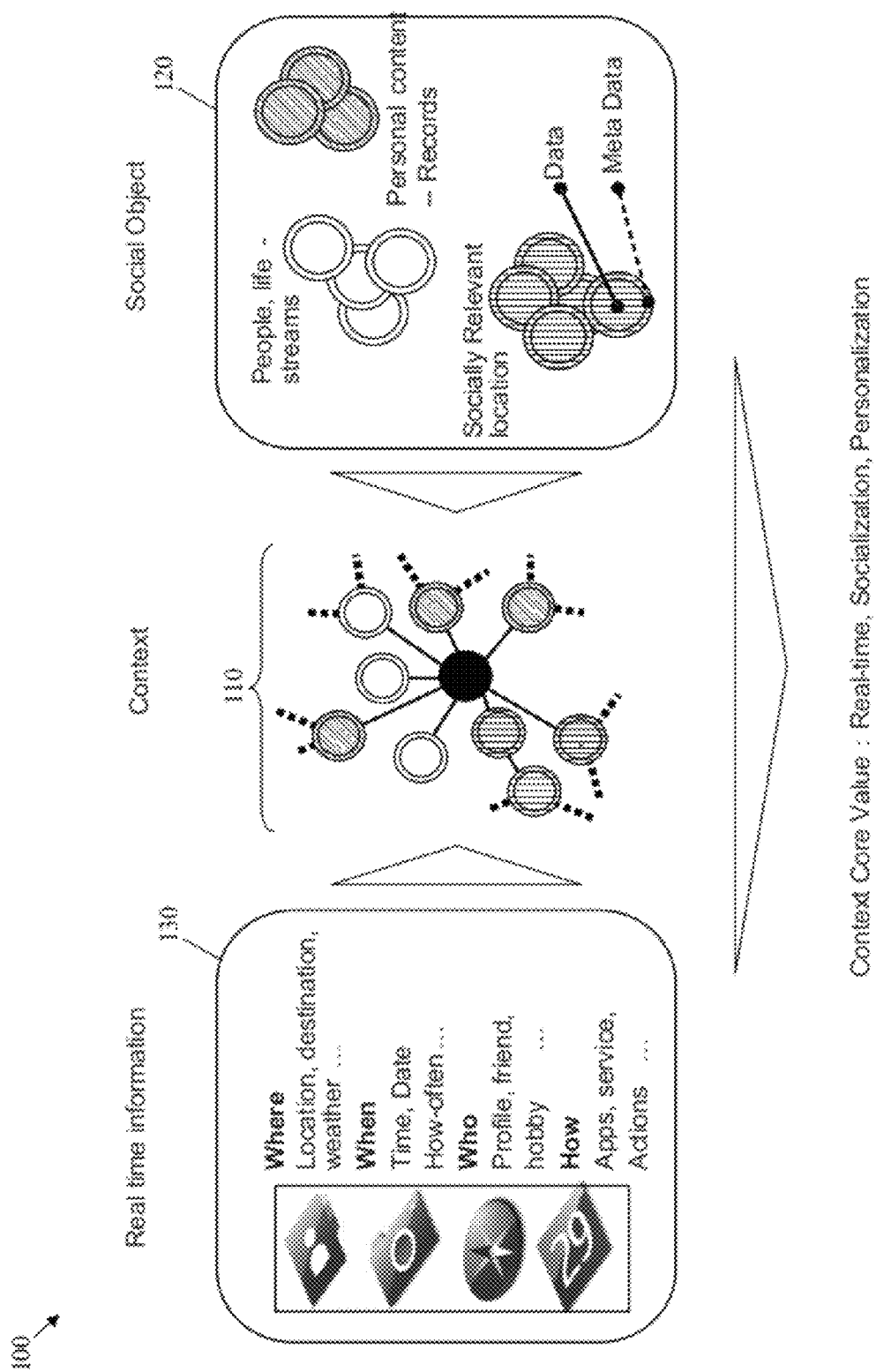
FIG. 1 is a schematic diagram of an embodiment of a context-based networking framework.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

ICN is one form of CON that is being considered as next generation Internet architecture to support both content dissemination traffic and conversational traffic. Different from today's IP routers, ICN routers may combine content routing, content computing power, and content local cache/storage capabilities. Achieving reliable and secure content distribution may be a challenge in ICN, such as when users have some controls over content distribution. In some ICN models, such as content centric network (CCN)/named data networking (NDN) models, a content name (e.g., a prefix) may be used for content routing, which may define the content reachability to guide content retrieval from ICN routers. Internet routing protocols, such as Open Shortest Path First (OSPF) and Border Gateway Protocol (BGP), have been proposed to be extended to populate content prefix to every ICN router (e.g., within a network, domain, or group) for content routing operation.

Due to the characteristics of the OSPF "flooding" protocol, the prefixes may be populated globally, i.e., to every router in the network or domain. This global flooding may be suitable for typical or traditional IP routing networks, which may rely on the topological links to form IP connectivity and host reachability. In such networks, every router may need a global knowledge of network topology. However, in ICN, the information publisher may want to impose constrains, e.g., based on privacy and security policy, on where content may be forwarded and temporarily cached (or permanently stored). For example, an enterprise may want to create a VPN in the ICN, which may only allow a designated subset of content routers to route and store content data. This content-based VPN may be established by consolidating a plurality of parameters of ICN network resources, such as link bandwidth, computing power, cache capacity, and the cached/stored content. Current OSPF/BGP protocols may not support such a content-based VPN.

Disclosed herein is a system and methods for implementing a selective content routing and storage protocol to support content-based VPN in ICN architecture. Content-based VPN, as a service, may allow a content publisher to isolate/divide ICN resources as a dedicated virtual domain over a publicly sharable infrastructure taking into account VPN service level agreements (SLAs), such as performance, security, reliability, and availability requirements, which may span both the intelligent content and transport plane of the ICN. Further the ICN service provider (SP) may expose several service application programming interfaces (APIs) to enable content publishing and request of content from the ICN. The system and methods may scope the VPN interactions within a privatized context in the ICN.

FIG. 1 illustrates an embodiment of a context-based networking framework 100. The context-based networking framework 100 may be based on context 110 that may be handled and processed in an ICN. The context 110 includes content data and additional information for improved handling and processing of content in the ICN, for instance in terms of routing, grouping, and storing. The context 110 may comprise a plurality of social objects 120 that combine content data, e.g. based on real time information 130. The content data may be routed and cached/stored in a plurality of content routers in the ICN. The social objects 120 may comprise data and meta-data. The data may comprise content data and the real time information 130. For example, the social objects may comprise personal content records, people life streams, socially relevant location records, and/or other user records. The real time information 130 may comprise location information (e.g., destination, weather), time information (e.g., time, date), profile information (e.g., friends, hobby), application information, and/or other information. The context-based networking framework 100 may arrange the content data as social objects 120 that form the context 110 to provide context core value to users, including real-time interaction, socialization, and personalization.

Figure 2:
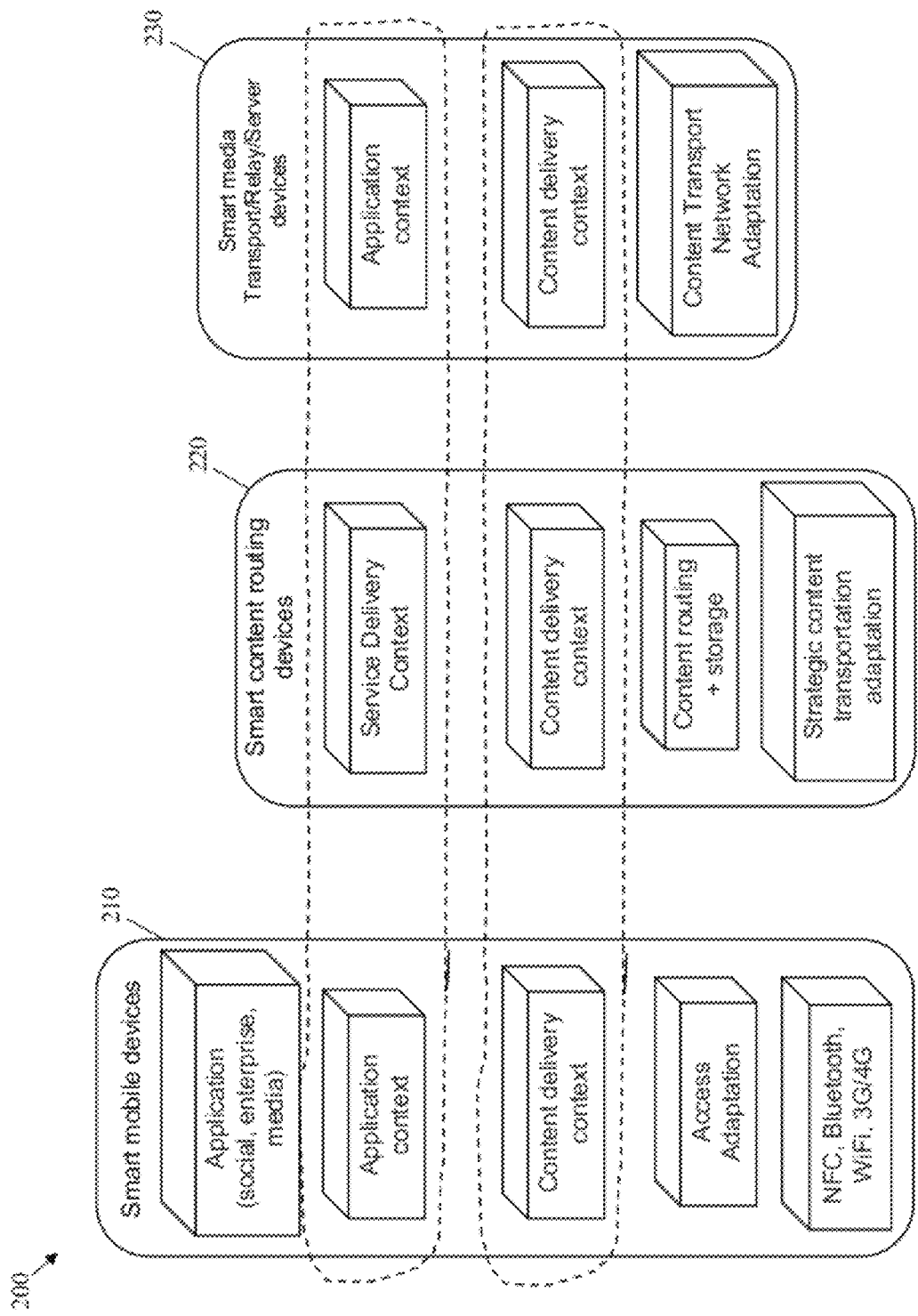
FIG. 2 is a schematic diagram of an embodiment of a context aware information-centric network (ICN) architecture.

FIG. 2 illustrates an embodiment of a context aware ICN architecture 200. The context aware ICN architecture 200 may be used to provide the context-based networking framework 100. The context aware ICN architecture 200 may handle the mapping of different logical layers or services between user nodes 210 (e.g., smart mobile devices), content routing nodes 220 (e.g., smart content routing devices), and other transport/relay/service network nodes 230 (e.g., smart media transport/relay/server devices). The term "smart" is used herein to refer to devices configured for improved context handling, processing, routing, and caching/storing.

The user nodes 210 may comprise a plurality of logical blocks or components for context based services or operations, including application, application context, content delivery context, access adaptation, and access technology or interface, such as wireless interfaces for mobile users (e.g., Near Field Communication (NFC), Bluetooth, Wireless Fidelity (WiFi), $3^{rd}/4^{th}$ generation mobile telecommunications (3G/4G)). The content routing nodes 220 may also comprise a plurality of logical blocks or components for context based services or operations, including service delivery context, content delivery context, content routing and storage, and strategic content transportation adaptation. The transport/relay/server 230 nodes may also comprise a plurality of logical blocks or components for context based services or operations, including application context, content delivery context, and content transport network adaptation.

To enable content dissemination in a VPN's context, the publishing of content may be extended to or scoped within a subset of content routers that may correspond to the VPN's instance. Scoping the published content to a subset of content routers for the VPN may be achieved according to how the control plane is instantiated. For instance, if each VPN in the ICN is instantiated with its own control plane, then each VPN's own control plane may also scope the flooding of any publishing action from the user. However, this approach may have relatively high provisioning and management cost.

Alternatively, a single instance of the control plane, e.g., with appropriate IDs, may be used to control the flooding for multiple VPNs. In this case, network routing protocols, such as the OSPF and/or BGP, may be extended to carry a selected set of secured router IDs (SRIs or SRIDs), for example a public key or hashed public key of each router, in a routing protocol data unit. The SRIDs may be associated with a content prefix that indicates a content object. The SRIDs may indicate the authorized content routers for forwarding content interests (requested content), forwarding content interest responses (content objects), and caching content corresponding to the prefix. Additionally, the routing protocol may carry a selected set of VPN IDs, which may indicate the VPN instances that are associated with the content routers for the content prefix. A set of VPN IDs may be associated with the set of SRIDs to group the content routers into logical VPN groups.

Figure 3:
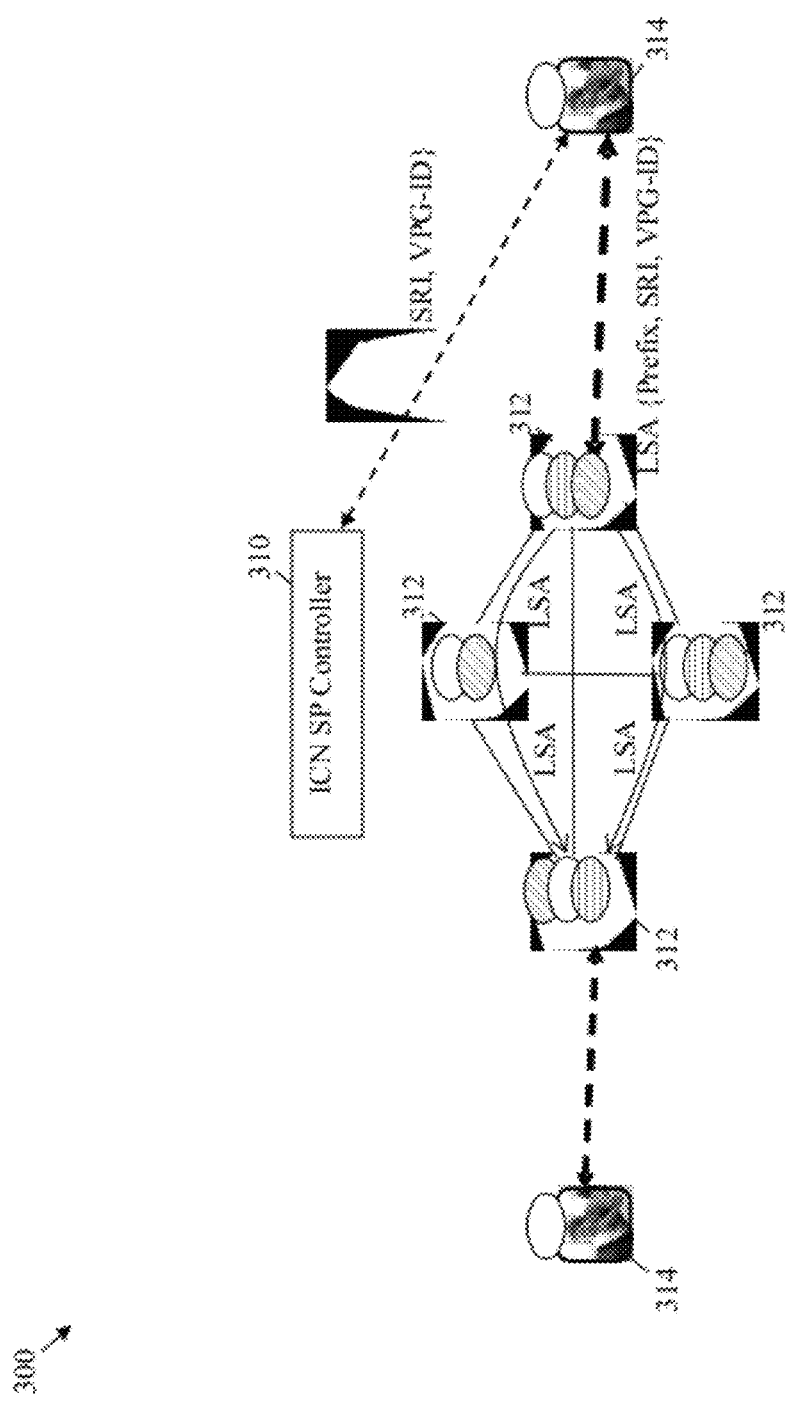
FIG. 3 is a schematic diagram of an embodiment of a link state advertisement (LSA) flooding scheme.

In an embodiment, a list of VPN IDs may be paired with a list for SRIDs and combined with a name prefix, e.g., (prefix, {VPN-ID list}, {router-ID list}), to form a binding relationship that defines which content router may or may not flood VPN specific LSAs to adjacent neighbors, and which content router may or may not cache the content data with the given prefix. FIG. 3 illustrates an embodiment of a LSA flooding scheme 300, which may be part of the context-based networking framework 100. The LSA flooding scheme 300 may be implemented to publish or flood VPN LSAs using a list for VPN IDs, a list of SRIDs, and a content prefix. The LSAs may be flooded in an ICN to populate content prefixes (in routing tables) in authorized or selected content routers that correspond to selected VPN instances or logical groups. The flooded prefixes in the ICN may uniquely identify content objects that may be published and delivered to customers based on request. Populating the prefix in selected content routers for selected VPN instances may virtually partition the content routing space as disjoint privatized sub-spaces of content routers and associated network resources, also referred to herein a VPNs, VPN instances, virtual private groups (VPGs), or VPG instances, interchangeably. The ICN may comprise a plurality of network nodes 312 that may be coupled to each other and to a plurality of customer nodes/sites 314. The ICN may also comprise an ICN SP controller 310, e.g., at a control plane of the ICN. The components of the ICN may be arranged as shown in FIG. 3.

The network nodes 312 may be coupled to each other via network links, e.g., fixed connections. The network nodes 312 may be any nodes, devices, or components that support transportation of traffic, e.g., frames and/or packets, through the ICN. The network nodes 312 may pass the traffic onto or receive the traffic from other nodes in the ICN. The network nodes 312 may comprise a plurality of content servers that store or cache content, which may be provided to users or subscribers, e.g., upon demand. For example, the network nodes 312 may be routers, switches, or bridges, such as backbone core bridges (BCBs), provider core bridges (PCBs), or label switch routers (LSRs).

Additionally, the network nodes 312 may comprise content routers that forward content based on content name prefixes. The content routers may be configured to route, cache, and/or store content. Some of the content routers, e.g., edge nodes, may be coupled to the customer nodes/sites 314, e.g., via a plurality of access networks, wired links, or wireless links. The content routers may be edge nodes and possibly core nodes in the ICN that forward content traffic to the customer nodes/sites 314 based on a customer request or demand. The content routers may also receive content requests from the customer nodes/sites 314. For example, the content routers may be enhanced versions of traditional routers or bridges, such as backbone edge bridges (BEBs), provider edge bridges (PEBs), or label edge routers (LERs) that forward content based on content name prefixes. From a transport perspective, the roles of these nodes may be the same (even for backward compatibility), but more importantly they may be enabled for content distribution through features like dynamic/persistent caching, and application level assistance. These content routers may also be functional CCN routers or content routers based on other proposals, in which case the goal of content dissemination is ingrained in the transportation layer. The ICN may be a combination of such enhanced content routers, traditional router/switches, or a combination thereof.

The customer nodes/sites 314 may be nodes, devices, or components configured to deliver content to and receive content requests from the users or user applications. For instance, the customer nodes may be fixed or mobile user-oriented devices, such as desktop computers, notebook computers, personal digital assistants (PDAs), or cellular telephones. Alternatively, the customer nodes/sites 314 may be connectivity devices at customer premises, such as modems or set-top boxes. The customer nodes/sites 314 may also comprise customer equipment (not shown) that may be configured to receive content from the ICN, e.g., via access networks, and distribute the content to a plurality of customers. For instance, the customer nodes/sites 314 may comprise optical network terminals (ONUs) and/or very high bit rate Digital Subscriber Line (VDSL) transceiver units at residential locations (VTU-Rs). The access networks may be any networks that provide access to the content in the OCN, such as Virtual Private Networks (VPNs). The customer nodes/sites 314 may also comprise service stations such as application servers.

At least some of the customer nodes/sites 314 may be mobile devices that may be coupled to the network nodes 312, e.g., edge nodes, via wireless links. The customer nodes/sites 314 may publish (push) and/or subscribe or request (pull) content in the ICN. The customer nodes/sites 314 may correspond to users and/or user applications. The users may be publishers, subscribers, Enterprises (e.g., Healthcare, Financial, Insurance, Movie studios, etc.), Social Networks, Governments, First Responder networks, Sensor Networks, Data Transmission Networks, Mobile-to-Mobile (M2M) networks, other content user types, or combinations thereof. The ICN may provide a plurality of services to the customer nodes/sites 314, including content publishing/subscribing or requesting, content cashing/storing, customer mobility support, security, and/or other content oriented services.

The ICN SP controller 310 may be a control plane entity that communicates with the network nodes 312 to distribute keys, e.g., SRIDs and/or VPN IDs, to the network nodes 312, e.g., content routers. The ICN SP controller 310 may also communicate with the customer nodes/sites 314 to authorize/authenticate users or customers and hence allow content publication/subscription, as described below. In an embodiment, the SRID may be obtained from a global name service, e.g., a Domain Name System (DNS). The SRID may be stored in the DNS with a corresponding readable name, for example content-router@Santa-Clara.ATT. When an application (by a publisher) sends its name to the DNS server, the SRID may be resolved by the server and returned to the application.

In the LSA flooding scheme 300, a SRID list may be routed in an opaque Type-Length-Value (TLV) in an extended LSA. The LSA may also comprise a VPN ID list and a prefix associated with content or content object. Each content router that receives the LSA message may check if the SRID list in the LSA includes the content router's own assigned SRID (e.g., by the ICN SP controller 310). The prefix in the LSA may be associated with all the VPN instances that match the received VPN ID list in the LSA. The content router may decide if it is allowed to further flood the LSA message, e.g., to neighbor nodes, or to drop the LSA message. For instance, the default operation may be to flood the advertisement message to the content router's neighbors, but the advertisement message may be dropped if the content router's policies prevent it from further flooding the advertisement message.

Specifically, if the SRID list comprises the content router's SRID, then the content router may add an entry in a local routing table for the prefix in the LSA and associate the prefix with the VPN IDs in the VPN ID list. If an entry for the prefix already exists in the local routing table, then the content router may add any VPN ID in the list that is not already associated with the prefix in the existing entry. The content router may then flood the LSA message to its neighbors. If the content router's own SRID is not included in the SRID list in the LSA, then the content router may drop the LSA without further flooding.

The LSAs may be transmitted by content publishers to enable user-empowered policy control for content access, storage, and routing. For instance, the ICN SP controller 310 may allow or expose service APIs for the customer nodes/sites 314 to enable content publishing and request of content in the ICN. As such, the ICN SP controller 310 may provide the SRID list to content publishers. The LSAs may be routed in the ICN using any supported routing protocol such as OSPF and/or BGP, e.g., using proper extended advertisements. The SRID in the LSA may be optional. If the LSA is routed without including a SRID, then the content routers may use the default routing protocol procedures to process the LSA and implement prefix flooding. As such, all the content routers may flood the prefix, and each router may cache the received content associated with the prefix.

By using this selective routing protocol, the content routers in an Autonomous System (AS) or domain (in the ICN) may have different content prefixes at the routing entries in their routing tables. Thus, this selective routing scheme may virtually partition the content routing space as disjoint sub-spaces, where each sub-space may comprise selected content routers privatized to serve one or more corresponding VPNs. For instance, a determined content prefix may only be routed and cached within its subspace of designated content routers. When a subscriber issues a request for an interested (requested) data, the interest (request) may only be routed in this virtual sub-space, and the returned data (interest response) may only be routed and cached in the content router within the selected sub-space.

Such constraints on advertisement may also be applied to inter-domain routing (routing between domains). In this case, updates (update messages) indicating selected content router(s) and VPN instance(s) (using SRIDs and VPN IDs) may be exchanged between domains. The indicated content routers and VPN instances in the updates may constrain the application of the updates to only those indicated content routers and VPN instances that are authorized to apply the updates across the domains. The updates may comprise publish and/or subscribe requests for content.

The LSA flooding scheme 300 may also provide cooperation between reachability policy (using the VPN ID list) and storage policy, under the supervisory of policy context, in the ICN. When a content is relayed back (in a response to a forwarded interest), the content routers associated with the indicated prefix may determine whether to cache or store the content. The content routers may be authorized to store or cache the relayed content according to the indicated SRID list and VPN ID list. Thus, using the SRID list and associated VPN ID list may also enable a selective storage approach.

Figure 4:
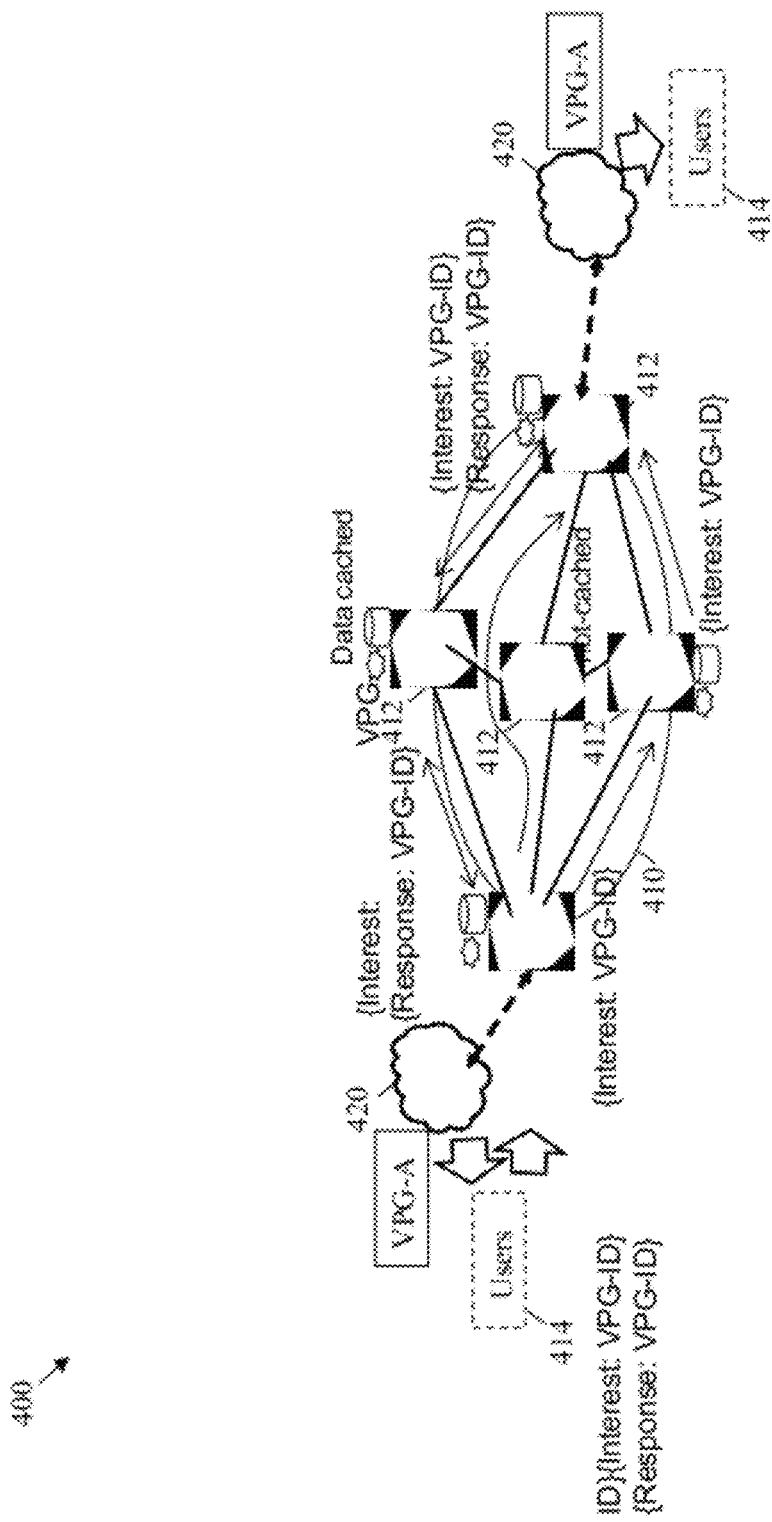
FIG. 4 is a schematic diagram of an embodiment of an ICN content routing and storage scheme.

FIG. 4 illustrates an embodiment of an ICN content routing and storage scheme 400, which may be part of the context-based networking framework 100. The ICN content routing and storage scheme 400 may be implemented to route and store content (content objects) in an ICN. Specifically, the content may be selectively routed and cached in the authorized content routers indicated by an SRID list and a VPN ID list associated with a content prefix. The ICN may comprise a plurality of network nodes 412 that may be coupled to each other and to a plurality of customer nodes/sites 414 associated with users (publishers/subscribers), e.g., via access networks 420. The network nodes 412 and customer nodes/sites 414 may be grouped in one or more VPNs (or VPGs) identified each by a VPN ID (or VPG ID). The components of the ICN may be arranged as shown in FIG. 4. The components of the ICN may be configured substantially similar to the corresponding components described above.

The content may be routed and cached when an interest is received and forwarded from a subscriber or user (e.g., from one of the customer nodes/sites 414). The interest may comprise a name prefix that indicates the requested content. The interest may be forwarded to a source content router (e.g., one of the network nodes 412) that initially stores the content from a publisher. Each content router that receives the interest may determine if the prefix in the interest matches an entry in the content router. If a prefix match is found, then the content router may forward the interest on the ports indicated in the prefix entry in the local routing table. Otherwise, the content router may drop the interest. As such, the interest may be forwarded in the ICN until the interest reaches a content router that stores or caches the indicated content, which may be the source content router that initially stores the content from a publisher or any content router in the ICN that caches the content.

The content may then be routed from the source content router or the caching content router across the ICN to reach the subscriber. The content may be fetched from the content router and routed back via a plurality of content routers according to the routing entries in the content routers, e.g., on a hop-by-hop basis. The routing entries may be pre-established using the LSA flooding scheme 300, where only the authorized content routers according to the SRID list and VPN ID list maintain entries comprising the prefix indicated in the interest. Only the authorized content routers may also cache (temporarily) or store (more permanently) the content while routing the content. The selective caching/storing may also be based on additional routing/storing policies or schemes that may be imposed by the ICN control plane or SP, e.g., to improve scalability and reachability.

In an embodiment, one or more SRIDs (or SRID list) may be stored as meta-data combined with the content data. The meta-data may be stored/cached and routed with the content and may be forwarded in the interest for requesting the content. The SRIDs may be provided by the content publisher or the source content router that stores the content, e.g., using the LSA flooding scheme 300. The SRIDs may specify the content routers that may access the content (associated with a content prefix) in the ICN. Additionally, the meta-data may also store one or more secured community ID (SCID), e.g., in a SCID list), that may also be provided by the publisher. The SCID may specify an authorized subscriber for accessing or obtaining the content. The SCID may also be associated with a publisher and carried in both interest and content. The publisher SCID may be used to verify the provenance of the publisher (e.g., a fraudulent publisher's content may be rejected by the ICN). The subscriber may also indicate its assigned SCID in the interest forwarded to obtain the content. Thus, the source content router may compare the SCID in the interest with the SCID list associated with the content to decide whether to forward the content. If the SCID in the interest does not match any of the SCIDs in the SCID list, then the source content router may decide not to accept the request and ignore the interest. Similarly, any of the content routers that cached the content or a portion of the content, e.g., from the source content router, may store the meta-data that includes the SRID list and the SCID list. Thus, any of the content routers that cache the content in the ICN and receive the interest may determine whether to accept the request.

Figure 5:
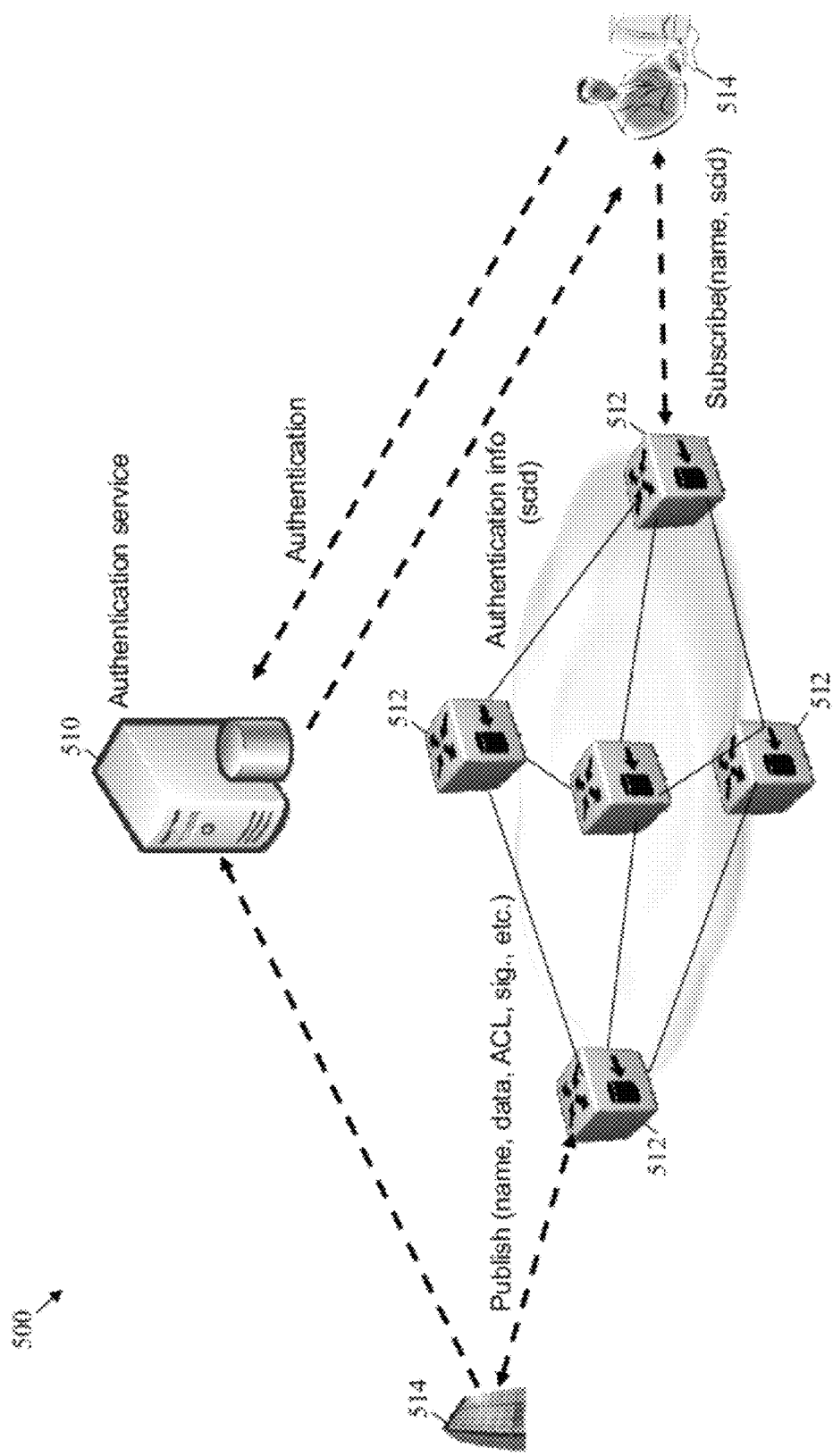
FIG. 5 is a schematic diagram of an embodiment of an ICN authentication scheme.

FIG. 5 illustrates an embodiment of an ICN authentication scheme 500, which may be part of the context-based networking framework 100. The ICN authentication scheme may be used in the ICN to authenticate a subscriber using a SCID and allow the subscriber to access content published by a publisher. The publisher may indicate one or more authorized subscribers for accessing the content by specifying the SCIDs for the authorized subscribers. The ICN may comprise a plurality of network nodes 512 and a plurality of customer nodes/sites 514, configured as described above. The ICN may also comprise or may be coupled to an authentication service 510, e.g., at a server. The network nodes 512 may comprise content routers, including edge nodes. The customer nodes/sites 514 may include publishers and subscribers. The authentication service 510 may communicate with publishers and subscribers to authenticate subscribers based on SCIDs, as described below.

First, a publisher (one of the customer nodes/sites 514) may publish the content using a publish function that includes the content name or prefix, content data, ACL (SCID list), a signature for published content, and/or other related information. The publisher may send the content and the other information to an edge content router (one of the network nodes 512) for publishing. The content may be initially stored at the edge content router, which may also flood the content prefix in the ICN, e.g., using the LSA flooding scheme 300. The publisher may also send the SCID list to the authentication service 510.

Hence, when a subscriber (one of the customer nodes/sites 514) wants to fetch the content, the subscriber may first send an authentication request to the authentication service 510. The authentication request may comprise subscriber credentials. Upon successful authentication, the authentication service 510 may return the SCID for the subscriber, e.g., from the SCID list by the provider associated with the same content (content prefix). The subscriber may then send an interest to request the content to the ICN, including the SCID, via one of the content routers (one of the network nodes 512), which may be an edge node. The interest request may be sent via a subscribe function that includes the content name prefix and the SCID. The content router may then forward the interest as described above to route content from the source content router or any content router that caches the content in the ICN to the subscriber. The content may also be further cached at one or more content routers along the routing path from the source to the subscriber, e.g., using the ICN content routing and storage scheme 400.

Figure 6:
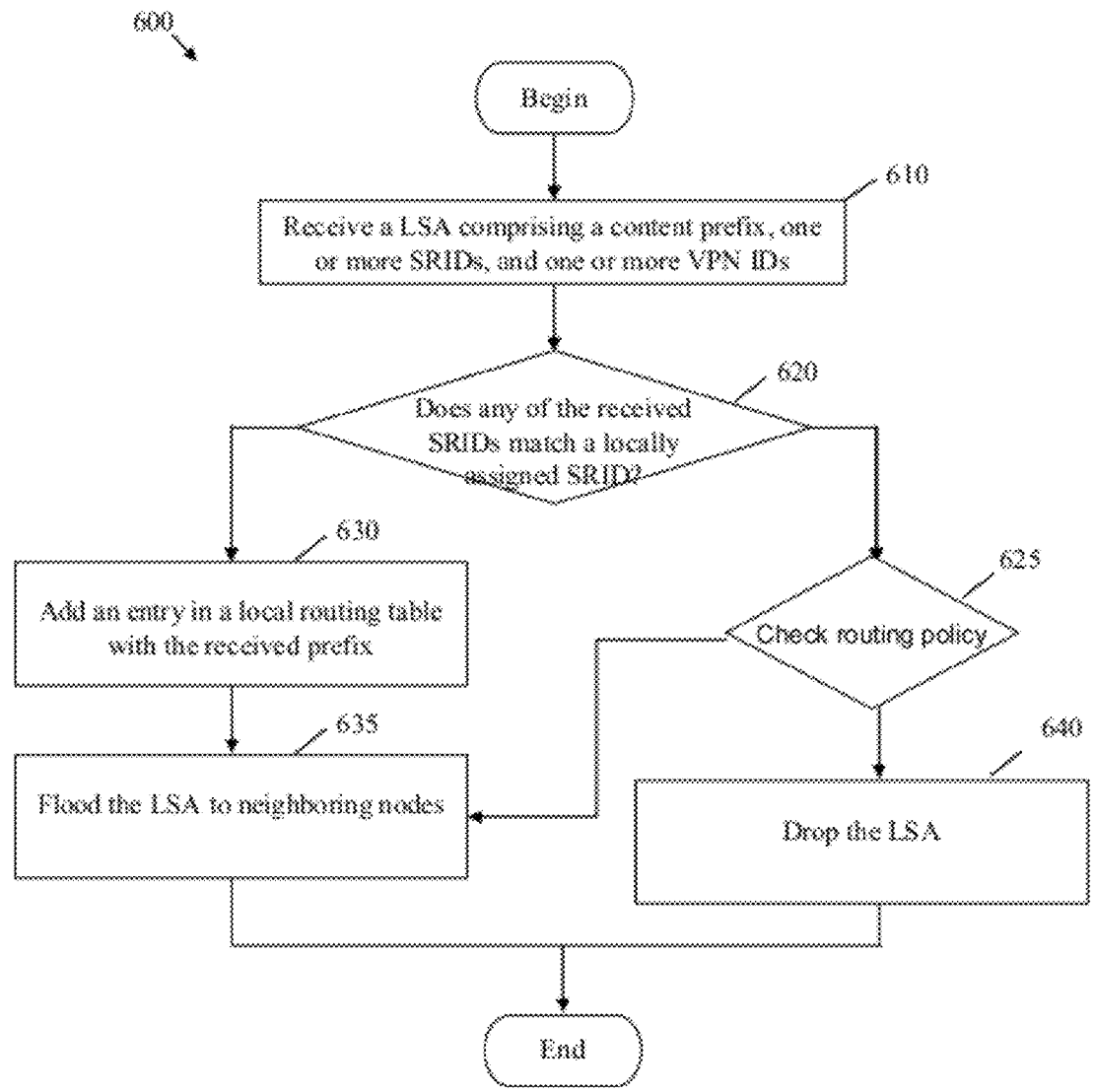
FIG. 6 is a flow chart of an embodiment of a selective content advertisement method.

FIG. 6 illustrates an embodiment of a selective content advertisement method 600, which may be part of the context-based networking framework 100. The selective content advertisement method 600 may be implemented as part of the LSA flooding scheme 300 in the ICN. The method 300 may begin at block 610, where a LSA comprising a content prefix, one or more SRIDs, and one or more VPN IDs may be received. The LSA may also comprise one or more SCIDs. The LSA may be sent from a publisher or a source content router that receives content from the publisher. At block 620, the method 600 may determine whether any of the received SRIDs match a locally assigned SRID. Each content router that receives the list of SRIDs may determine whether the content router's owned assigned SRID is in the list. If the condition in block 620 is met, then the method 600 may proceed to block 630. Otherwise, the method 600 may proceed to block 625. At block 630, an entry may be added in local routing table with the received prefix. The content router may add an entry for the prefix and associate the prefix with the received VPN IDs. At block 635, the LSA may be flooded to neighboring nodes. Alternatively, at block 625 the method 600 may check routing policy and proceed to block 640, where the ISA may be dropped. The method 600 may then end.

Figure 7:
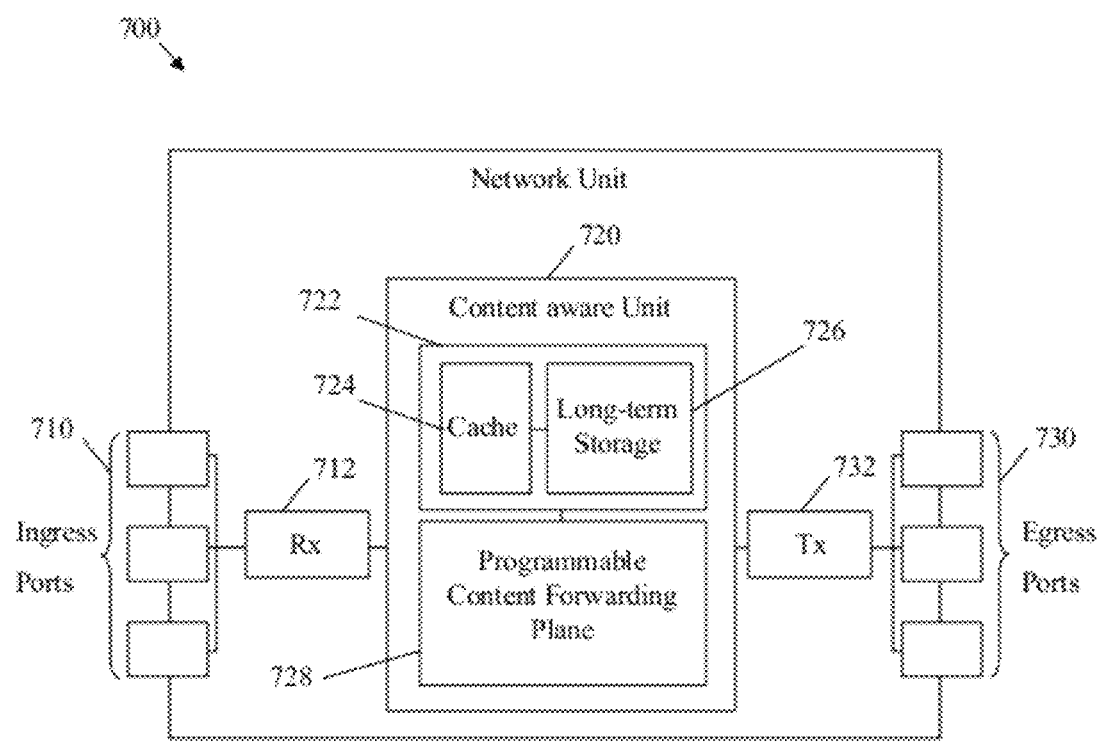
FIG. 7 is a schematic diagram of an embodiment of a network unit.

FIG. 7 illustrates an embodiment of a network unit 700, which may be any device that transports and processes data through a network. For instance, the network unit 700 may be located in the content router or any node in the ICN. The network unit 700 may also be configured to implement or support the schemes and methods described above. The network unit 700 may comprise one or more ingress ports or units 710 coupled to a receiver (Rx) 712 for receiving signals and frames/data from other network components. The network unit 700 may comprise a content aware unit 720 to determine which network components to send content to. The content aware unit 720 may be implemented using hardware, software, or both. The network unit 700 may also comprise one or more egress ports or units 730 coupled to a transmitter (Tx) 732 for transmitting signals and frames/data to the other network components. The receiver 712, content aware unit 720, and transmitter 732 may also be configured to implement at least some of the disclosed methods, which may be based on hardware, software, or both. The components of the network unit 700 may be arranged as shown in FIG. 7.

The content aware unit 720 may also comprise a programmable content forwarding plane block 728 and one or more storage blocks 722 that may be coupled to the programmable content forwarding plane block 728. The programmable content forwarding plane block 728 may be configured to implement content forwarding and processing functions, such as at an application layer or L3, where the content may be forwarded based on content name or prefix and possibly other content related information that maps the content to network traffic. Such mapping information may be maintained in a content table at the content aware unit 720 or the network unit 700. The programmable content forwarding plane block 728 may interpret user requests for content and accordingly fetch content, e.g., based on meta-data and/or content name (prefix), from the network or other content routers and may store the content, e.g., temporarily, in the storage blocks 722. The programmable content forwarding plane block 728 may then forward the cached content to the user. The programmable content forwarding plane block 728 may be implemented using software, hardware, or both and may operate above the IP layer or L2. The storage blocks 722 may comprise a cache 724 for temporarily storing content, such as content that is requested by a subscriber. Additionally, the storage blocks 722 may comprise a long-term storage 726 for storing content relatively longer, such as content submitted by a publisher. For instance, the cache 724 and the long-term storage 726 may include Dynamic random-access memories (DRAMs), solid-state drives (SSDs), hard disks, or combinations thereof.

Figure 8:
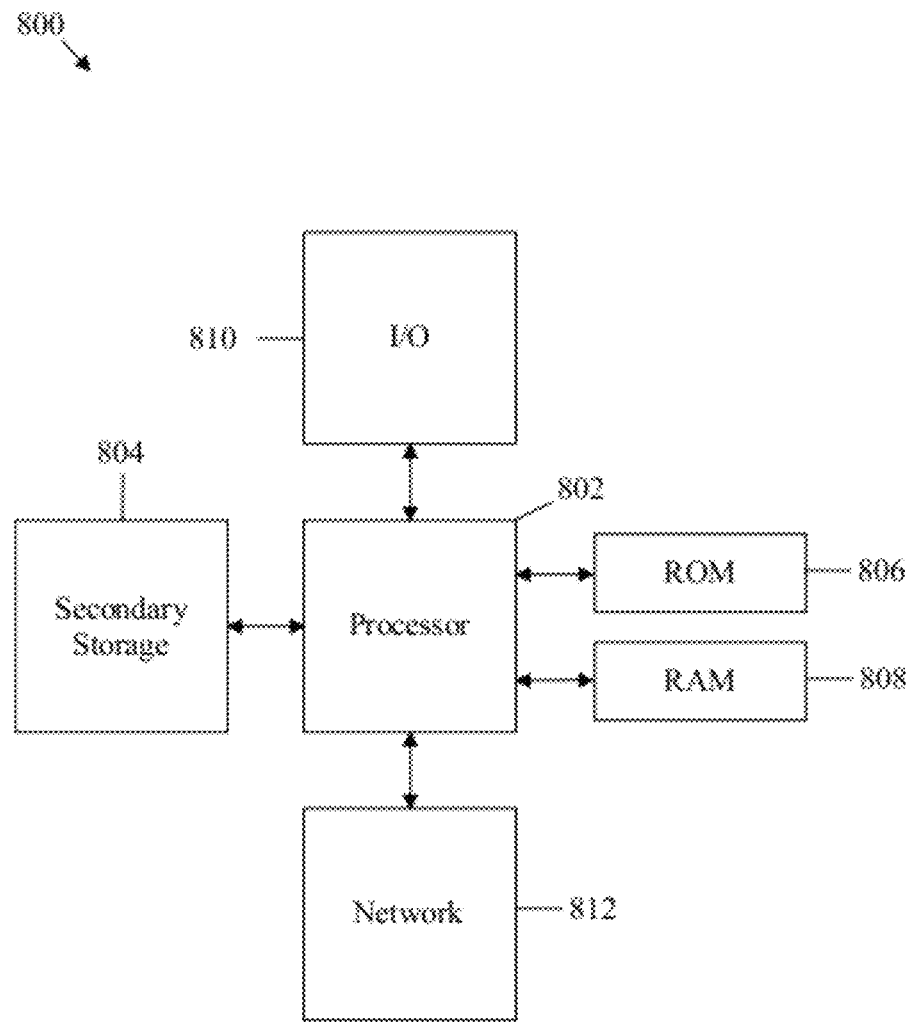
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A content router configured to operate in an information-centric network (ICN), the content router comprising:
    a receiver configured to receive an advertisement for a content object, wherein the advertisement comprises:
        a content prefix identifying the content object;
        a list of secured router identifiers (SRIDs), the SRIDs identifying a plurality of content routers in the ICN that are authorized to store the content object; and
        at least one Virtual Private Network (VPN) identifier (ID) identifying at least one VPN authorized to access the content object;
    a transmitter;
    a storage;
    a processor coupled to the receiver, the transmitter, and the storage, wherein the processor is configured to:
        determine whether the content router is authorized to route and cache the content object by determining whether the list of SRIDs comprises a locally assigned SRID that is specific to the content outer;
        cause the transmitter to flood the advertisement to a plurality of neighboring nodes and cause the storage to cache the content object upon receipt when the list of SRIDs comprises the locally assigned SRID that is specific to the content router; and
        prevent the storage from caching the content object upon receipt when the list of SRIDs does not comprise the locally assigned SRID that is specific to the content router.

2. The content router of claim 1, wherein a name of the content object is added to an entry in a local routing table and associated with the at least one VPN ID.

3. The content router of claim 2, wherein the entry in the routing table is used to forward a received interest for the content object associated with the content name and to forward a received interest response comprising the content object, and wherein the content object comprises content data.

4. The content router of claim 3, wherein the received content data is cached locally when at least one of the content data is associated with the content name in the entry, and meta-data received with the content data comprises a list of SRIDs that includes the locally assigned SRID.

5. The content router of claim 3, wherein the received content data is forwarded when meta-data received with the content data comprises a list of secured community identifiers (SCIDs) that includes a SCID for one of a subscriber and a publisher of the content data.

6. A method implemented by at least one network component, comprising:
    receiving at a content router an advertisement for a published content object the advertisement comprising a content name of the content object, a list of secured router identifiers (SRIDs) that indicate a plurality of content routers that are authorized to transmit, receive, and cache the content object, and a list of virtual private group (VPG) identifiers (IDs) for virtual private network (VPN) instances authorized to access the content object and associated with the content routers;
    when an assigned SRID that is specific to the content router is detected in the list of SRIDs:
        determining that the content router is authorized to transmit, receive, and cache the content object;
        populating a routing table with the content name of the content object based on the determination;

flooding the advertisement to a plurality of neighboring nodes based on the determination; and when the assigned SRID that is specific to the content router is not detected in the list of SRIDs determining that the content router is not authorized to transmit, receive, and cache the content object.

7. The method implemented by the at least one network component of claim 6, wherein the SRIDs are provided by a Domain Name System (DNS) to a publisher in response to receiving a public name from the publisher.

8. The method implemented by the at least one network component of claim 6, wherein the SRIDs correspond to a plurality of public keys or hashed public keys for the content routers.

9. The method implemented by the at least one network component of claim 6, further comprising:
   receiving an interest for a content that comprises a second content name and a secured community identifier (SCID), wherein the SCIDs corresponds to at least one of a plurality of public keys and hashed public keys for one of a subscriber and a publisher;
   forwarding cached content data associated with the second content name when the SCID is detected in meta-data combined with the content data; and
   dropping the interest when the SCID is not at least one of detected and matched with the content data.

10. The method of claim 6, wherein the advertisement is a link state advertisement (LSA), and wherein flooding the advertisement comprises employing constraint flooding based on the SRIDs.

11. The method of claim 10, wherein the LSA is flooded using an Open Shortest Path First (OSPF) routing protocol to implement the constraint flooding based on the SRIDs, and wherein the LSA includes an opaque Type-Length-Value (TLV) that comprises the SRIDs and the VPN IDs.

12. The method of claim 10, wherein the LSA is flooded using a Border Gateway Protocol (BGP) to implement the constraint flooding based on the SRIDs, and wherein the LSA includes an opaque Type-Length-Value (TLV) that comprises the SRIDs and the VPN IDs.

13. The method of claim 6, wherein the advertisement is received from a content publisher of the content object, and wherein the list of SRIDs that indicate the content routers that are authorized to transmit, receive, and cache the content object is populated by the content publisher.

14. The method of claim 13, further comprising receiving a secured community identifier (SCID) that indicates a network component that is authorized to subscribe to the content object, and wherein the SCID is associated with the content name and the content publisher.

15. The method of claim 14, wherein the content name, at least one of the SRIDs, and the SCID are included as a meta-data combined with the content object, and wherein the meta-data is forwarded and cashed with the content object.

16. The method of claim 6, further comprising:
   forwarding, according to an entry in the routing table, a received interest for the content object; and
   forwarding, according to an entry in the routing table, a received interest response that comprises the content object.

17. The method of claim 16, further comprising, caching the content object when meta-data received with the content object includes the SKID of the content outer.

18. The content router of claim 1, wherein the locally assigned SRID that is specific to the content router is received from a service provider controller.

* * * * *